United States Patent [19]

Ma

[11] Patent Number: 6,023,929
[45] Date of Patent: Feb. 15, 2000

[54] ENGINE WITH CYLINDER DEACTIVATION

[75] Inventor: Thomas Tsoi-Hei Ma, South Woodham Ferrers, United Kingdom

[73] Assignee: Ford Global Technologies, Inc., Dearborn, Mich.

[21] Appl. No.: 09/029,619

[22] PCT Filed: Aug. 5, 1996

[86] PCT No.: PCT/GB96/01896
  § 371 Date: Aug. 25, 1998
  § 102(e) Date: Aug. 25, 1998

[87] PCT Pub. No.: WO97/08441
  PCT Pub. Date: Mar. 6, 1997

[30] Foreign Application Priority Data

Aug. 26, 1995 [GB] United Kingdom .................. 9517562

[51] Int. Cl.$^7$ ...................................................... F01N 3/00
[52] U.S. Cl. ................................ 60/295; 60/297; 60/285; 123/198 F; 123/481
[58] Field of Search ........................... 60/285, 286, 295, 60/297; 123/481, 443, 198 F

[56] References Cited

U.S. PATENT DOCUMENTS

| 4,303,053 | 12/1981 | Etoh et al. ........................... 123/198 F |
| 4,345,432 | 8/1982 | Iida et al. ................................. 60/290 |
| 5,562,086 | 10/1996 | Asada et al. ......................... 123/198 F |
| 5,647,207 | 7/1997 | Grotjahn et al. ......................... 60/300 |

FOREIGN PATENT DOCUMENTS 0 627 548 A1   5/1994   European Pat. Off. .

*Primary Examiner*—Thomas Denion
*Assistant Examiner*—Binh Tran
*Attorney, Agent, or Firm*—Jerome R. Drouillard

[57] ABSTRACT

A multi-cylinder spark ignition internal combustion engine is described having two banks of cylinders 10a, 10b. One bank of cylinders may be selectively disabled by cutting off its fuel supply while continuing to receive air. The exhaust system includes an $NO_x$ trap 20 to store $NO_x$ gases while the exhaust gases contain excess air. During part load operation, the engine is run with one bank of cylinders disabled most of the time during which $NO_x$ gases are stored in the $NO_x$ trap 20. In order to permit the trap 20 to be regenerated or purged periodically, both bank are fired at is the same time for short intervals to supply a stoichiometric or reducing mixture to the exhaust system.

12 Claims, 2 Drawing Sheets

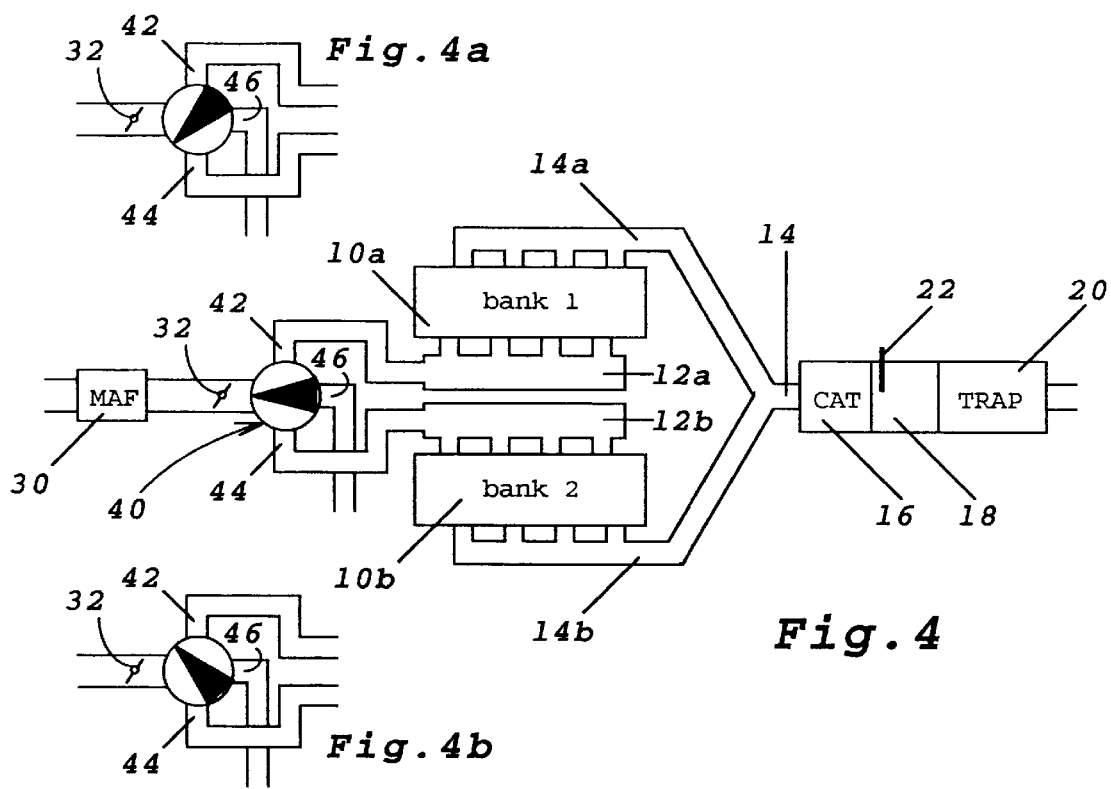

மு6,023,929

ENGINE WITH CYLINDER DEACTIVATION

FIELD OF THE INVENTION

The present invention relates to a multi-cylinder spark ignition internal combustion engine having two banks of cylinders supplied with intake air through a common main throttle, and disabling means for selectively deactivating one bank of cylinders by cutting off its fuel supply.

BACKGROUND OF THE INVENTION

Systems for cylinder deactivation have been proposed previously, in order to achieve improved fuel economy and reduced emission when the engine is operating at part load. Such systems rely on the fact that spark ignition engines operate less efficiently at low load because of the pumping losses caused by throttling. Especially in a large engine, it is more efficient to run one bank of cylinder under higher load than two banks under lesser load, while producing the same output power. Cutting off the fuel supply to one bank of cylinders achieves the desired reduction in fuel consumption but when the disabled cylinders are still allowed to pump air, this upsets the stoichiometry of the exhaust gases and interferes with the operation of the catalytic converter. The presence of excess air in the exhaust gases means that the catalytic converter cannot neutralise $NO_x$ present in the exhaust gases, as this requires a stoichiometric or reducing atmosphere. For this reason, known systems take special steps during cylinder deactivation to avoid air reaching the catalytic converter through the disabled cylinders. The steps that have been proposed for this purpose include maintaining the intake and exhaust valves of the disabled cylinders permanently shut, or running the disabled cylinders with 100% EGR. Both these proposals have disadvantages in that valve disablement is costly to implement and switching to 100% EGR gives rise to problems in controlling the combustion during the periods of changeover between normal operation and deactivation. Also, undesirable leakage of EGR gases into the intake system of firing cylinders is difficult to avoid.

JP-A-55 029002 discloses an engine have two groups of cylinders 1–3 and 4–6. Under high low, both groups of cylinders are operational but under light load, cylinders 1–3 are disabled. The exhaust gases from both groups of cylinder pass through a main catalytic converter which is preceded by a first oxygen sensor. The exhaust gases from cylinders 4–6 additionally pass through another catalytic converter arranged upstream of the common catalytic converter and itself preceded by a second oxygen sensor. The first oxygen sensor sets the fuel quantity during high load operation and the second sets the fuel when only one group of cylinder is firing. During part load, the main catalytic converter and the first oxygen sensor tend to cool down and the engine is forced to run on all cylinders for a short time to heat the main catalytic converter whenever its temperature is sensed by a detector to be dropping below a minimum threshold.

JP-A-55 49549 discloses an engine with two groups of cylinders that can be selectively deactivated during part load operation. The engine exhaust system has three catalytic converters one main converter common to both groups of cylinders and two further converters arranged upstream of the main catalytic converter, each associated with a respective one of the two groups of the cylinders. Each time that the engine is switched from running on both groups of cylinders to only one group, the group of cylinders selected for deactivation is alternated. As a result, neither group of the cylinders is allowed to run cold and neither group is subjected to wear at a different rate from the other group.

SUMMARY OF THE INVENTION

With a view to mitigating the foregoing disadvantages, the invention provides in accordance with a first aspect a multi-cylinder spark ignition internal combustion engine having two groups of cylinders, and disabling means for selectively deactivating one group of cylinders by cutting off its fuel supply, wherein the two groups of cylinders are connected to a common exhaust system containing a catalytic converter, the disabling means are operative to interrupt the fuel supply to one group of cylinders during part load operation so as to deactivate said one group of cylinders while supplying air to said one group of cylinders, and means are provided for resupplying fuel to said one group of cylinders at periodic intervals to reactivate said one group of cylinders, characterised in that the common exhaust system further comprises an $NO_x$ trap and in that the duration of the intervals of reactivation are sufficient to regenerate the $NO_x$ trap.

During deactivation of one group of cylinders, air pumped through those cylinders reaches the exhaust system to make the catalytic converter operate only as an oxidation catalyst. Such $NO_x$ as is produced during this time by the firing cylinders is stored in the $NO_x$ trap. At periodic intervals, when both groups of cylinders are activated simultaneously, the exhaust mixture is returned to a stoichiometric or reducing mixture to neutralise the $NO_x$ stored in the $NO_x$ trap, thereby regenerating or purging the $NO_x$ trap.

Another problem with disabling one group of cylinders is that if the cylinder disablement is prolonged, the group will risk a build up of oil and deposits within the cylinders.

According to a second aspect of the invention, there is provided a multi-cylinder spark ignition internal combustion engine having two groups of cylinders, and disabling means for selectively deactivating one group of cylinders by cutting off its fuel supply, wherein the two groups of cylinders are connected to a common exhaust system containing a catalytic converter, and disabling means are operative during part load operation to interrupt the fuel supply so as to deactivate one group of cylinders at a time while supplying air to the disabled group of cylinders, characterised in that the exhaust system includes an $NO_x$ trap, the disabling means are operative to interrupt the fuel supply alternately to the groups of cylinders during part load operation, and in that during changeover of the deactivation, there are intervals during which both groups of cylinders are activated simultaneously, the intervals having sufficient duration to regenerate the $NO_x$ trap.

In this aspect of the invention, the groups are alternately deactivated so that the groups are subjected to equal wear and deposits that may be formed on the combustion chambers during cylinder deactivation will be burnt off more regularly and equally in both groups of cylinders. Preferably, the intake system has compensation means to reduce the air supply to the two groups of cylinders during the interval when they are activated simultaneously in order to avoid a sudden change in the engine output power.

The compensation means may comprise an electronic throttle that is regulated by a control system to maintain constant output power during the intervals when both groups of cylinders are activated simultaneously. Alternatively, the compensation means may comprise an ON/OFF valve arranged in series with an auxiliary throttle in a passage bypassing the main throttle, the auxiliary and main throttles being ganged main throttle, the auxiliary and main throttles being ganged such that the flow through the two passages when the ON/OFF valve is open is always in the same predetermined ratio to the mass air flow through the main throttle alone. In this case, the size of the auxiliary throttle and bypass passage may be calibrated such that the output power when the main throttle alone supplies air to the two banks of cylinders is the same as the output power when both the main and auxiliary throttles supply air to only one of the two banks. In this way, the complexity of an electronic throttle can be avoided and replaced by a simple ON/OFF valve in series with the auxiliary throttle.

While one bank of cylinders is deactivated, the other bank works under higher load and produces $NO_x$ gases in the exhaust system. These gases cannot be reduced in the three-way catalytic converter because the disabled bank of cylinders continues to supply air and create an oxidising atmosphere. in the exhaust system. The three-way catalytic converter therefore acts only as an oxidation catalyst to neutralise HC and CO in the exhaust gases and the $NO_x$ trap, which itself incorporated a three-way catalyst, is relied upon to store the $NO_x$ gases until such time as they too can be neutralised when the $NO_x$ trap is purged by supplying it with a stoichiometric or reducing atmosphere.

The $NO_x$ trap has only a limited capacity but the invention allows freedom in setting the time between purging to avoid saturation of the trap. The frequency with which the engine is operated with both banks of cylinders activated simultaneously can be set as desired to ensure that the trap remains at a high storage efficiency. During these intervals, the fuelling can be set to achieve, as desired, a stoichiometric or a reducing atmosphere in the exhaust gases passing through the catalytic converter, to regenerate or purge the $NO_x$ trap fully.

BRIEF DESCRIPTION OF THE DRAWINGS

The invention will now be described further, by way of example, with reference to the accompanying drawings, in which:

FIG. 4 is a view similar to FIG. 1 of an embodiment having a modified intake system, FIGS. 4a and 4b show a detail of the embodiment of FIG. 4 in alternative positions of the valve supplying air to the intake manifolds of the two banks of cylinders.

DETAILED DESCRIPTION OF THE PREFERRED EMBODIMENT

Figure 1:
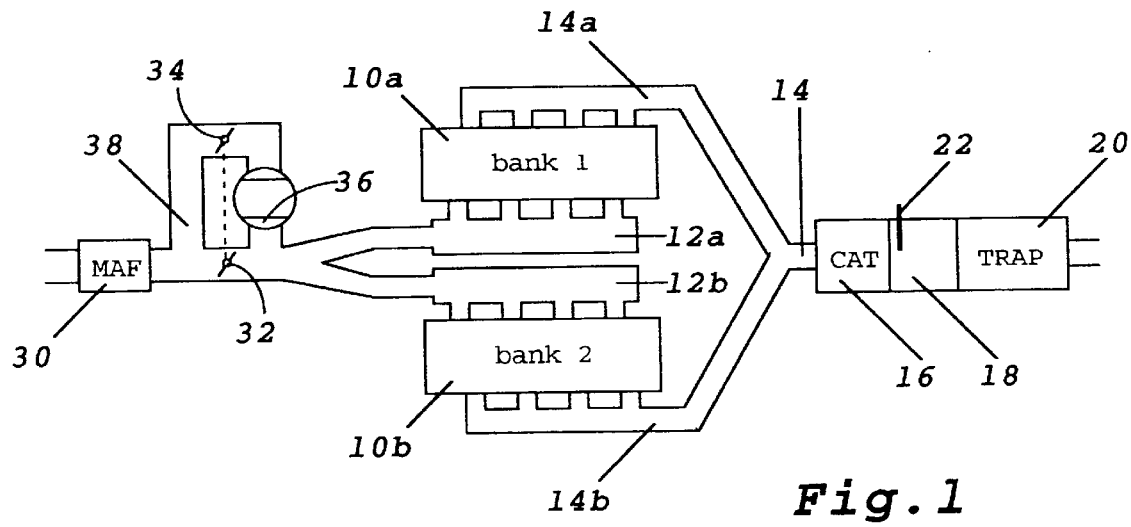
FIG. 1 is a schematic representation of an internal combustion engine.

In FIG. 1 an internal combustion engine has two banks of cylinders 10a and 10b having intake manifolds 12a and 12b and exhaust manifolds 14a and 14b, respectively. The exhaust manifolds 14a and 14b are joined to one another at a section 14 that precedes an after treatment system consisting of a catalytic converter 16, a burner chamber 18 having an igniter 22 and a $NO_x$ trap 20, which itself contains a three-way catalyst.

The intake system for both banks of cylinders comprises a mass air flow meter 30 connected in series with a main throttle 32 that provides air to both intake manifolds 12a and 12b. In addition, the intake system comprises a bypass passage 38 containing a second throttle 34 ganged with the main throttle 32 and an ON/OFF valve 36 for selectively opening and closing the bypass passage 38 depending on whether one or both banks of cylinders of the engine are activated.

Under high load operation, the ON/OFF valve 36 occupies the position illustrated to disable the bypass passage 38. Fuel is metered to both banks of cylinders so that both banks fire normally and produce an exhaust gas mixture that is stoichiometric and can be purified by the three-way catalysts.

During low and part load operation, the fuel supply to one of the banks 10a and 10b is shut off while the other bank continues to fire normally. The air supply to the deactivated bank of cylinders is not discontinued and these cylinders pass air into the exhaust system. The three-way catalytic converter in the after treatment system can now only operate as an oxidation catalyst in this oxidising is atmosphere and the $NO_x$ produced by the firing bank of cylinders cannot be neutralised. To overcome this problem, the invention provides the $NO_x$ trap to store the $NO_x$ gases and prevent them from being discharged to ambient atmosphere.

The $NO_x$ trap has only a finite capacity and this mode of operation cannot be maintained indefinitely if $NO_x$ gases are not to be released to the atmosphere. For this reason it is necessary to regenerate or purge the $NO_x$ trap at regular intervals by running the engine in such a manner as to produce a reducing or stoichiometric exhaust mixture. This is achieved by periodically running both banks of cylinders simultaneously by supplying fuel to both banks for a duration long enough to purge the $NO_x$ trap.

Figure 2:
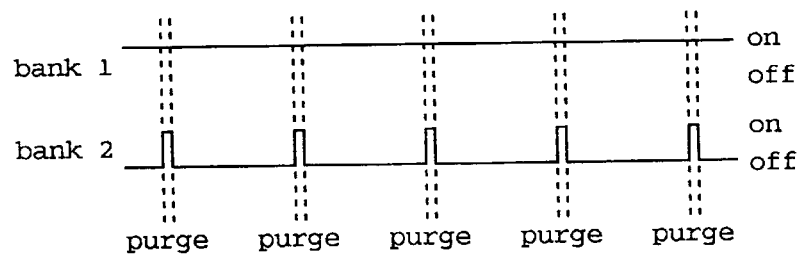
FIGS. 2 and 3 are timing diagrams showing two alternative methods of fuelling the internal combustion engine in FIG. 1.
Figure 3:
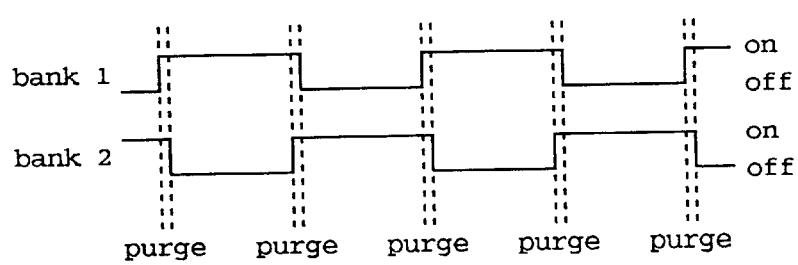

The engine of FIG. 1 can be operated in one of two modes. In the first mode the same bank of cylinders is always deactivated while in the second mode the deactivation alternates between the two banks of cylinders. The first mode is represented by the fuel timing diagram shown in FIG. 2 in which fuel supply is permanently ON to the first bank of cylinders and pulsed ON at regular intervals to the second bank of cylinders. The second mode on the other hand is represented by FIG. 3 in which both banks of cylinders are switched ON and OFF with the same mark-to-space ratio as one another, this mark-to-space ratio being slightly in excess of 1:1 so that at the changeover between banks there are defined brief purge intervals during which both banks of cylinders are activated simultaneously.

Both modes of operation of the engine achieve the desired purging of the $NO_x$ trap but the second mode has the advantage that the banks are subjected to equal wear and deposits are removed more regularly from the disabled cylinders.

At the times that the engine operates with all cylinders firing, it will tend to produce more output power than when one bank is deactivated for a given position of the main throttle 32. The purpose of the ON/OFF valve 36 is to avoid changes in engine output power during the purge intervals and during the changeover between one bank and two banks operation. When one bank is disabled, the ON/OFF valve 36 is turned to its fully open position to allow air to flow through the bypass passage 38 and the second throttle 34. This latter throttle 34 is ganged to operate in unison with the main throttle 32 and, for a given position of the main throttle 32, supplies the correct amount of compensation air flow such that the output power from the engine when one bank of cylinders is deactivated is the same as the output power when both banks of cylinders are firing.

Exhaust gas ignition systems (EGI) have previously been proposed to accelerate the light-off of a catalytic converter. The engine is intentionally run with an excessively rich mixture so that the exhaust gases contain hydrocarbons, carbon monoxide and hydrogen and additional air is introduced directly into the exhaust system to produce an ignitable mixture that is burnt immediately upstream of the catalytic converter to bring it quickly to its light-off temperature during cold starts. The burner chamber 18 is provided in the exhaust after treatment system in FIG. 1 for this purpose but in the described embodiment of this invention, it is possible to avoid the need for an expensive source of additional air. If one bank of cylinders is run with a very rich mixture and the other bank is deactivated but continues to receive air, then the resultant mixture will be ignitable in the burner chamber 18 using the igniter 22. If the firing cylinders receive the fuel that should have been burnt by both banks of cylinders, they will be running excessively rich but the resultant exhaust gas mixture reaching the burner 18 will still be stoichiometric and burn completely. The heat released will quickly bring the $NO_x$ trap which also contains a three-way catalyst to its light-off temperature.

The embodiment of FIG. 1 suffers from the disadvantage that the disabled bank of cylinders will still be partially throttled and would be performing unnecessary pumping work against the manifold vacuum. This disadvantage is avoided in the embodiment of FIG. 4 in that unthrottled ambient air is supplied to the deactivated bank of cylinders in order to reduce the pumping loss to a minimum.

In the embodiment of FIG. 4 like numerals have been used to designate components previously described by reference to FIG. 1 in order to avoid unnecessary repetition. The essential difference resides in the connection between the main throttle 32 and the intake manifolds 12a and 12b which in this case includes a diverter valve 40. For ease of description the bypass passage 38 has been omitted it being assumed in this case that the throttle 32 is an electronic throttle but a bypass passage may be used as previously described if preferred to maintain constant output power regardless of engine operating mode.

The diverter valve 40 has two inlet and two outlet ports. The first inlet port, which has no reference numeral is connected to the throttle 32 and the mass air flow meter 30. The second inlet port 46 is directly connected to ambient air and the two outlet ports 42 and 44 lead respectively to the intake manifolds 12a and 12b. The valve has a rotatable diverter element which is V-shaped in cross-section and can be moved between the three positions shown in FIGS. 4, 4a and 4b respectively.

In the position shown in FIG. 4 the diverter element points at the throttle 32 and obstructs the port 46 completely. Only air passing the mass air flow meter 30 reaches the intake manifold 12a and 12b and the valve 40 splits the air in equal amounts. This is the position occupied by the valve 40 during normal operation with all cylinders firing.

The rotation of the diverter element to the position shown in FIG. 4a has the effect of connecting the intake manifold 12a to the air passing the intake throttle 32 and the mass air flow meter 30, while connecting the intake manifold 12b to the ambient without throttling the air. This is the position adopted by the valve 40 when the second bank of cylinders 10b is deactivated. The first bank of cylinders 10a now operates normally while the second bank of cylinders 10b operates with the minimum pumping work and delivers air to the exhaust system.

If the same bank of cylinders is disabled every time, then the valve 40 need only be capable of movement between the positions shown in FIGS. 4 and 4a. If however it is desired to be able to switch the deactivation alternately between banks of cylinders, then the valve 40 can be moved further to the position shown in FIG. 4b. From the symmetry with FIG. 4a it will be appreciated that the only difference this will make is that the first bank of cylinders 10a would be disabled instead of the second bank 10b.

An advantage of the embodiment of FIG. 4 is that it is very tolerant to leakage in the diverter valve 40. If any leakage does occur, air will enter the firing cylinders. This will not disturb the combustion process but merely cause the mixture strength to be weakened slightly. If the engine is calibrated to supply a nominally stoichiometric mixture to the firing bank of cylinders, based on the air flow measured by the mass air flow meter, any leakage that occurs will make the mixture slightly leaner than stoichiometric, which is advantageous in ensuring low hydrocarbon and carbon monoxide in the feed gases supplied to the after treatment system. $NO_x$ may be increased in the feed gases but the storage of the $NO_x$ in a trap and the subsequent purging of the trap will prevent this pollutant from being discharged to atmosphere. Thus the aftertreatment system can be effective in controlling the discharge of the three main noxious gases without the critical control of the stoichiometry of the exhaust gases that is required when using a three-way catalyst.

I claim:

1. A multi-cylinder spark ignition internal combustion engine comprising:

an intake system having a main throttle;

two banks of cylinders connected to said intake system and a common exhaust system, with said exhaust system having a catalytic converter and a $NO_x$ trap;

disabling means for selectively deactivating one bank of cylinders by interrupting fuel supply to said one bank of cylinders during part load operation while supplying air to said one bank of cylinders; and, means for resupplying fuel to said one bank of cylinders at periodic intervals to reactivate said one bank of cylinders, with a duration of said intervals being sufficient to regenerate said $NO_x$ trap.

2. An engine according to claim 1, wherein said intake system comprises a compensation means to reduce air supply to each said bank of cylinders when each said bank is activated simultaneously, thereby avoiding a sudden change in engine output.

3. An engine according to claim 2, wherein said compensation means comprises an electronically actuated throttle coupled to an electronic control system.

4. An engine according to claim 2, wherein said compensation means comprises an ON/OFF valve arranged in series with a bypass throttle arranged in a bypass passage bypassing a main throttle arranged in a main passage, with said main and bypass throttles being ganged such that flow through said main and bypass passages when said ON/OFF valve is open is in a same predetermined ratio to a mass air flow through said main throttle alone.

5. An engine according to claim 1, wherein, when one bank of cylinders is deactivated, said one bank of cylinders communicates with ambient air through a diverter valve so that air supplied to said one bank of cylinders is unthrottled.

6. An engine according to claim 5, wherein said diverter valve comprises:

two inlets connected to ambient air and said main throttle, respectively;

two outlets, each connected to an intake manifold of a respective bank of cylinders; and, a rotatable element having a first position, in which said inlet connected to ambient air is obstructed while said inlet connected to said main throttle is connected simultaneously to both outlets, and a second position, in which said main throttle is connected to only one of said outlets while said inlet connected to ambient air is connected to the other of said outlets.

7. A multi-cylinder spark ignition internal combustion engine comprising:

an intake system having a main throttle;

two banks of cylinders connected to said intake system and a common exhaust system, with said exhaust system having a catalytic converter and a $NO_x$ trap; and, disabling means for selectively deactivating one bank of cylinders by alternately interrupting fuel supply to said two banks of cylinders during part load operation, thereby deactivating one bank of cylinders at a time, while supplying air to said deactivated bank of cylinders, therebeing intervals during changeover of deactivation in which both said banks of cylinders are activated simultaneously, with a duration of said intervals being sufficient to regenerate said $NO_x$ trap.

8. An engine according to claim 7, wherein said intake system comprises a compensation means to reduce air supply to each said bank of cylinders when each said bank is activated simultaneously, thereby avoiding a sudden change in engine output.

9. An engine according to claim 8, wherein said compensation means comprises an electronically actuated throttle coupled to an electronic control system.

10. An engine according to claim 8, wherein said compensation means comprises an ON/OFF valve arranged in series with a bypass throttle arranged in a bypass passage bypassing a main throttle arranged in a main passage, with said main and bypass throttles being ganged such that flow through said main and bypass passages when said ON/OFF valve is open is in a same predetermined ratio to a mass air flow through said main throttle alone.

11. An engine according to claim 7, wherein, when one bank of cylinders is deactivated, said one bank of cylinders communicates with ambient air through a diverter valve so that air supplied to said one bank of cylinders is unthrottled.

12. An engine according to claim 11, wherein said diverter valve comprises:

two inlets connected to ambient air and said main throttle, respectively;

two outlets, each connected to an intake manifold of a respective bank of cylinders; and, a rotatable element having a first position, in which said inlet connected to ambient air is obstructed while said inlet connected to said main throttle is connected simultaneously to both outlets, and a second position, in which said main throttle is connected to only one of said outlets while said inlet connected to ambient air is connected to the other of said outlets.

* * * * *